US011349996B2

(12) United States Patent
Kumar et al.

(10) Patent No.: US 11,349,996 B2
(45) Date of Patent: *May 31, 2022

(54) OFFLINE CHARGING OF COMMUNICATIONS SERVICES

(71) Applicant: T-Mobile USA, Inc., Bellevue, WA (US)

(72) Inventors: Jyot Kumar, Issaquah, WA (US); Nitin Bhakri, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/123,845

(22) Filed: Dec. 16, 2020

(65) Prior Publication Data

US 2021/0105364 A1  Apr. 8, 2021

Related U.S. Application Data

(63) Continuation of application No. 16/790,638, filed on Feb. 13, 2020, now Pat. No. 10,904,398.

(60) Provisional application No. 62/900,394, filed on Sep. 13, 2019.

(51) Int. Cl.
*H04M 15/00* (2006.01)
(52) U.S. Cl.
CPC ........... *H04M 15/64* (2013.01); *H04M 15/41* (2013.01); *H04M 15/53* (2013.01); *H04M 2215/0164* (2013.01); *H04M 2215/0172* (2013.01)

(58) Field of Classification Search
None
See application file for complete search history.

(56) References Cited

U.S. PATENT DOCUMENTS

| 9,723,153 | B2 | 8/2017 | Garg et al. |
| 9,900,444 | B1 | 2/2018 | Seetharaman et al. |
| 10,904,398 | B1 * | 1/2021 | Kumar .................. H04M 15/41 |
| 2008/0319884 | A1 | 12/2008 | Yi et al. |
| 2009/0228956 | A1 | 9/2009 | He et al. |
| 2012/0095905 | A1 | 4/2012 | Hodges |
| 2016/0127565 | A1 | 5/2016 | Sharma et al. |
| 2018/0124253 | A1 * | 5/2018 | Xu ......................... H04M 15/66 |
| 2018/0167424 | A1 | 6/2018 | Nair et al. |

* cited by examiner

*Primary Examiner* — Quoc D Tran
(74) *Attorney, Agent, or Firm* — Perkins Coie LLP

(57) ABSTRACT

The disclosed embodiments include a method for offline charging performed by an anchoring node of a telecommunications network. The anchoring node can send a request to an online charging system (OCS), where the request is for online metering of a call by a subscriber of the telecommunications network. The anchoring node may obtain an indication of an exception to the online metering of the call. In response, the anchoring node can perform a default call handling (DCH) procedure to allow the call on the telecommunications network despite an inability to perform the online metering. The anchoring node also generates a modified charging detail record (CDR) that includes an indication of the exception. The anchoring node can then send a message, which includes at least an indication of the modified CDR, to enable a mediation server to perform offline charging for the call.

20 Claims, 4 Drawing Sheets

OFFLINE CHARGING OF COMMUNICATIONS SERVICES

CROSS-REFERENCES TO RELATED APPLICATION

This application is a continuation of U.S. patent application Ser. No. 16/790,638, filed Feb. 13, 2020, entitled "OFFLINE CHARGING OF COMMUNICATIONS SERVICES"; which claims benefit of U.S. Provisional Application 62/900,394, filed Sep. 13, 2019, entitled "OFFLINE CHARGING OF COMMUNICATIONS SERVICES"; each of which are incorporated by reference in their entireties.

BACKGROUND

Mobile electronic devices (e.g., smart phones, personal digital assistants, computer tablets) provide advanced computing capabilities and services to users. Examples of the services include voice communications, text and other messaging communications, video and other multimedia communications, and streaming services. Often, users, via their mobile devices, access such services as customers or subscribers of telecommunications carriers, which provide telecommunications networks within which the users make voice calls, send text messages, send and receive data, and so on.

The telecommunications carriers can provide their subscribers with various service plans. For example, carriers can offer and provide contractual subscription plans, where a customer is locked into an ongoing plan for a certain duration. As another example, carriers can offer and provide prepaid, or non-contractual plans, where a customer determines, during or after each segment of the plan, whether to renew the plan.

Carriers offer customers a variety of contractual and prepaid plans of service. For example, one carrier can offer a low cost, prepaid plan, where a customer receives a basic menu of services (e.g., unlimited voice and text communications, and 1 gigabyte of data per month), as well as a higher level, and higher cost, plan, where a customer receives an enhanced or greater menu of services (e.g., unlimited voice and text communications, and 4 gigabytes of data per month). Other carriers can offer similar plans and services.

The prepaid accounts, because they are limited both in services and access, can be cumbersome to manage and charge for utilization, especially because mechanisms that enable online metering of voice calls can malfunction. As a result, carriers either terminate the voice calls until the metering mechanism goes online or forego charging the subscriber for the voice call. This and other problems exist with respect to performing online metering for prepaid accounts and then forgoing charging customers for usage of the prepaid services on a network.

BRIEF DESCRIPTION OF THE DRAWINGS

Embodiments of the present technology will be described and explained through the use of the accompanying drawings.

Figure 1:
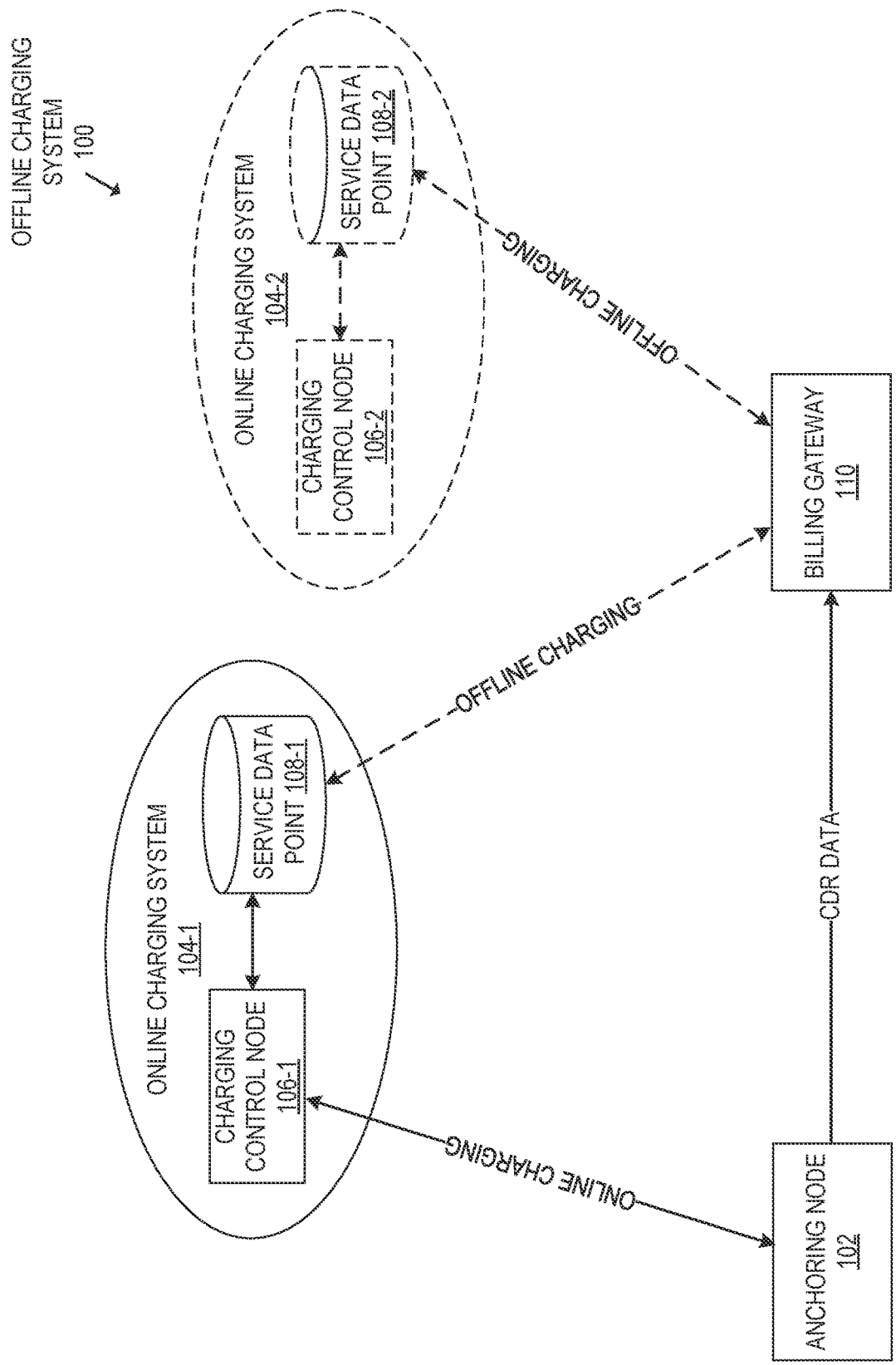
FIG. 1 is a block diagram that illustrates an offline charging system of a telecommunications network.

The drawings, some components and/or operations may be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended embodiments.

DETAILED DESCRIPTION

The disclosed embodiments perform offline charging to overcome problems associated with an inability to perform online metering of calls, such as voice calls. Specifically, a problem with prepaid service plans is the occasional inability to accurately capture the consumption of services by subscribers. A subscription to a prepaid service plan allocates an amount for services (e.g., voice call minutes) in a subscriber's account balance and are available for consumption by the subscriber. In an ideal case, a service provider can meter usage while a voice call is ongoing. That is, the service provider can perform online metering in real-time or near real-time. This allows the service provider to properly account for ongoing usage and terminate a voice call when the subscriber's account balance has been exhausted.

In some instances, network disruptions interfere with the ability of a service provider to accurately capture usage of prepaid services. For example, a mechanism that performs online metering could go offline. To avoid giving a subscriber free access to prepaid services while the metering function is offline, the service provider could terminate any voice call until the metering function goes back online. However, punishing subscribers by denying their prepaid services results in a poor user experience that detracts from the appeal of such services. As such, service providers allow subscribers to benefit from metering interruptions by forgoing charging the subscribers for their service usage while a metering function is offline. As a result, the service provider cannot properly manage its services and experiences substantial revenue losses due to the inability to properly capture utilization.

The disclosed embodiments modify existing online metering systems to capture service utilization offline. FIG. 1 is a block diagram that illustrates an offline charging system. The offline charging system 100 includes an anchoring node 102 that handles voice call procedures (though the system may include many of such nodes). Examples of the anchoring node include a Mobile Switching Centre Server (MSS) and/or a Telephony Application Server (TAS). An MSS is a core network element that controls network switching subsystem elements. The MSS is associated with switching functions, such as call set-up, release, and routing. However, it can also perform a host of other functions, including routing SMS messages, conference calls, fax, and service billing as well as interfacing with other networks. A TAS performs functions including in-network answering machines, automatic call forwarding, conference bridges and many other types of applications. The TAS provides call-termination or subscriber-independent applications. These include such capabilities as local number portability; free-call routing resolution; conference bridge services; and unified messaging. TAS applications are of two general types, those that are signaling only, and those that involve media manipulation. The former is often related to routing resolution—local number portability, free-call routing, and other services where the dialed number must be translated to a routable address. An example involving media manipulation would be conference bridge applications.

The anchoring node 102 communicates with components of an online charging system (OCS) 104-1. The components of the OCS 104-1 include a charging control node (CCN) 106-1 and a service data point (SDP) 108-1. The CCN 106-1 is a signaling control point that can receive and process, meter, and rate (i.e., assign a value to) services and content usage requests. The CCN 106-1 can communicate with the SDP 108-1, perform session control, identify a correct device and account number, and create a charging detail record (CDR), which is commonly also referred to as a call detail record. The CDR may be created in the CCN, anchoring nodes, or another node of the network. The SDP 108-1 can receive and respond to requests for service processing. The SDP can include a rating engine (e.g., rating logic) that can hold subscriber profile information and account data such as an available account balance. A CDR is a formatted collection of information about a chargeable telecommunication event (e.g., voice call, Internet utilization) that is used to bill a subscriber of a service provider. A CDR may include information such as a time of call set-up, duration of the call, and an amount of data transferred. A separate CDR is typically generated for each subscriber to be charged.

The anchoring node 102 communicates with a billing gateway (BG) 110. The BG 110 is an embodiment of a mediation server or assembly that can process billing related data from one network, device or system into a form that can be used by a billing system. An online metering process is managed by the OCS 104-1. That is, a prepaid service is charged to a prepaid subscriber while the service is being consumed (e.g., in real-time or near real-time). When a subscriber places a voice call, the anchoring node 102 interacts with the OCS 104-1 to make online allocations by deducting from the subscribers account balance periodically for the duration of the voice call. The account balance may be deducted by predefined units such as a time unit, count of calls, or volume.

In normal online metering operations, the prepaid subscriber initiates a voice call on a telecommunications network. To establish a prepaid voice call, the anchoring node 102 interrogates the CCN 106-1 to check whether the subscriber's current service plan has an available balance and/or to check the status of the subscriber. For example, the prepaid subscriber may have an active status or a suspended status. If the subscriber has an active status, the CCN 106-1 can request a deduction from the subscriber's account balance in proportion to a service being consumed. The anchoring node 102 generates a CDR for each successful voice call, and the CDR data is pushed by the anchoring node 102 to the BG 110 in one or more files.

The disclosed embodiments handle exceptions to online metering of a voice call. The offline charging system 100 allows the voice call to continue despite the inability to perform online metering of the voice call. As such, the subscriber does not experience a service interruption. Unlike in existing systems, the offline charging system 100 can still rate the voice call periodically despite any interruption to an online rating function. As a result, the telecommunications service providers (e.g., 2G, 3G, 4G, 5G) can mitigate or avoid revenue loss. In addition, the disclosed embodiments enable of the system to apply different offline rating policies that depend on specific exception conditions.

In one example, the point of failure of an online rating function may be the CCN 106-1 or another element of the OCS 104-1 such as a rating engine of the SDP 108-1. As such, the OCS 104-1 may fail to deduct a service utilization from a subscribers account due to an error condition. The service provider still allows a voice call to connect/continue despite the inability to perform online metering of that call (commonly referred to as a "failed-opened.") That is, a voice call is allowed to continue despite a failed online metering process. The prepaid subscribers voice call experience is thus not impacted by allowing default call handling (DCH) procedures to continue despite any online metering errors. The offline charging is enabled with modified CDR data combined with signaling procedures for charging voice calls offline. The nodes that normally handle voice calls can use the modified CDR data and signaling procedures to adjust account balances of prepaid subscribers for voice calls that were not metered online due to an error or exception.

Specifically, the nodes that normally handle call procedures can generate partial CDR data that they send to a mediation server (e.g., BG 110) to perform offline charging of voice calls without impacting subscribers' call experience. In some embodiments, a partial CDR can be generated and/or communicated periodically based on configurable time(s) to include communication information about portions of a voice call. For example, the offline charging system 100 can be set to generate partial CDR data every two minutes for any ongoing voice call. The partial CDR data is then sent to a mediation server to perform offline charging.

In some embodiments, offline charging is configurable based on the type of exception for the online metering. The type of exception can be indicated in a modified CDR that is communicated to the mediation server, where the mediation server can provide differential billing based on the type of exception. The mediation server that receives the modified CDR can process the CDR data in accordance with procedures for handling specific exceptions, where those exceptions can be processed differently, at different times of the same voice call or for different voice calls.

In some embodiments, the BG 110 can send the modified CDR to the SDP 108-1 once it becomes available to rate the voice call. As shown, the offline charging system 100 can include a georedundant SDP 108-2 that can rate a prepaid subscriber offline. That is, the offline charging system 100 can operate multiple rating engines in the same or different geographic locations, as a form of redundancy when the OCS 104-1 or any of its components fail. For example, the redundant OCS 104-2 can rate the voice call based on an exception indicated in a modified CDR.

The OCS 104-1 can fail to perform an online rating of voice calls for a variety of reasons. For example, an application of the OCS 104-1 may receive an unrecognized command and/or reject a command for online metering. As such, the OCS 104-1 would not perform an online rating procedure for a voice call indicated in that command. Examples of other errors or exceptions include: the OCS 104-1 may altogether fail to respond to any interrogation from the anchoring node 102; a connection to the OCS 104-1 or among the components of the OCS 104-1 may fail; the OCS 104-1 may become unavailable because the OCS 104-1 is offline for maintenance; the OCS 104-1 may experience overload conditions, reach resource limits, or experience overutilization; a rating engine could fail or be unavailable; the voice call can experience an unreachable tariff; etc.

When an exception to online metering occurs, the OCS 104-1 can issue a reason code, which the OCS returns to the anchoring node 102. The reason code indicates the reason for the online rating failure. A reason code is processed through a rules-based logic to determine how to handle and rate the voice call. In some cases, the anchoring node 102 may not receive any response from the OCS 104-1 within a threshold period. As such, the anchoring node 102 may experience a timeout condition. Where a timeout condition occurs, the anchoring node 102 can treat the voice call according to a default offline charging procedure.

Figure 2:
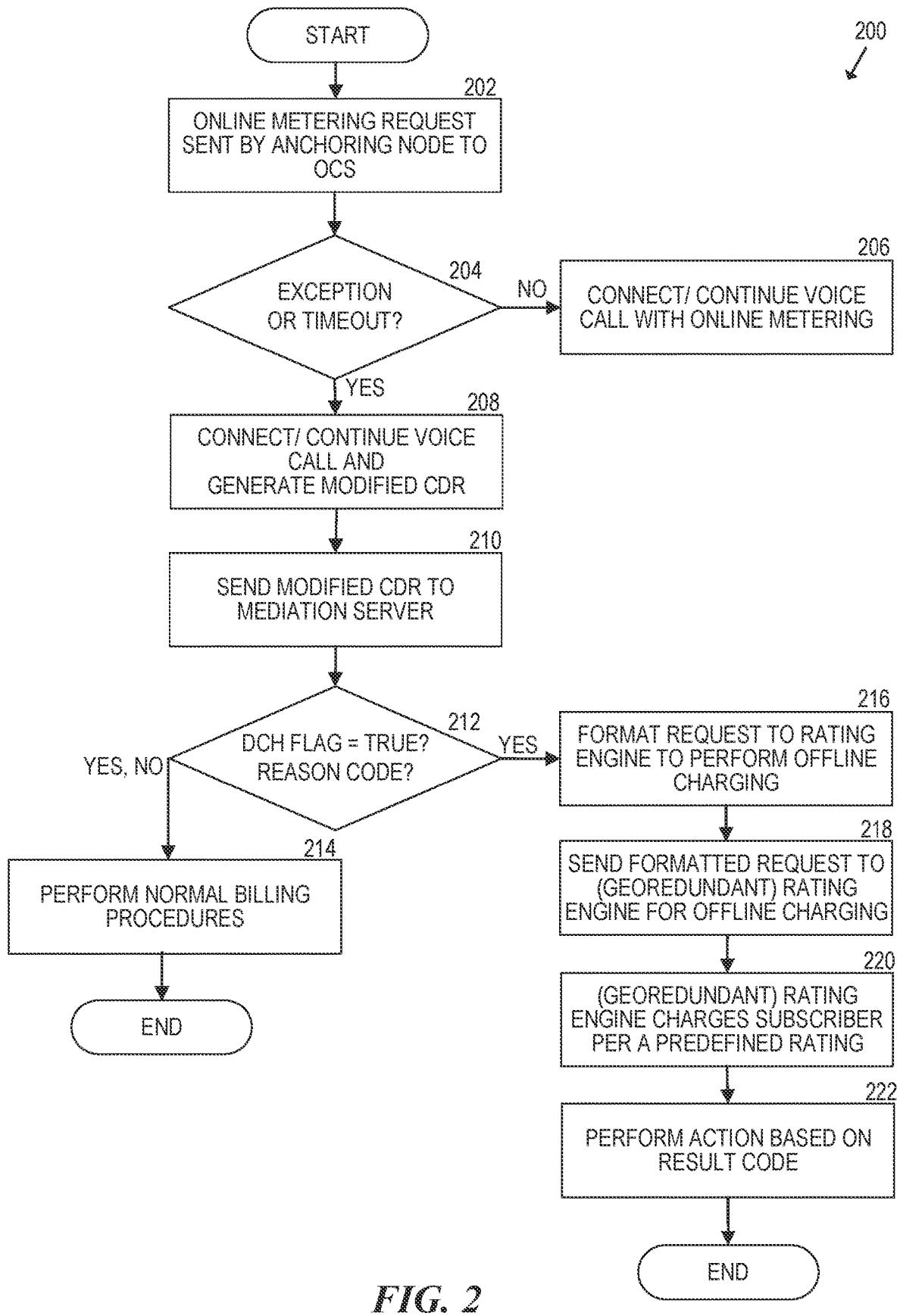
FIG. 2 is a flow diagram that illustrates a process for offline charging of a voice call on a telecommunications network.

FIG. 2 is a flow diagram that illustrates a process for offline charging of a prepaid voice call. The process 200 is performed when a failed-opened call occurs. The failed-opened call is addressed with modified CDR data to charge an account offline. In 202, an anchoring node is triggered to issue an online charging request that it sends to an OCS. That is, an anchoring node interrogates an OCS when it detects that a prepaid voice call is being made for a voice call service. The request to the OCS may be a message that contains information about the subscriber and the voice call, which can be used to determine whether the subscriber's account balance is enough to cover the voice call. The anchoring node expects to receive a response from the OCS, where the response includes information about the subscriber and/or the subscriber's account balance. However, an exception can prevent the online metering of the voice call.

In 204, the anchoring node receives an exception message from the CCN in response to the request. The exception message indicates that an error occurred with the online metering process for the voice call. The exception message can include a reason code that indicates a source of the failed online metering. Alternatively, the anchoring node may not receive any response within a threshold period such that a timeout condition is satisfied.

In 206, the anchoring node did not receive an indication of an exception to online metering. Instead, the anchoring node received a response that includes information sought to perform online metering of the voice call. As such, the anchoring node performs DCH procedures that allow the voice call to connect or allow an ongoing voice call to continue while being metered online.

In 208, the anchoring node received an exception message or experienced a timeout. The anchoring node then allows a failed-opened call to proceed by using DCH procedures, despite the inability to simultaneously meter the voice call. In addition, the anchoring node generates CDR data that can be associated with an interrogation time. As such, CDR data can be indexed based on the time that the anchoring node interrogated the OCS. The CDR data is modified to include a DCH flag that is set to true because the voice call continued despite an inability to perform online metering. The modified CDR can include a reason code to filter voice calls for exception handling while the remaining voice calls are processed by default handling. In one example, the anchoring nodes generate the CDR data or forward the CDR data to the BG. In some embodiments, the reason codes are mapped by the anchoring node 102 to internally stored result codes. A result code is associated with one or more actions that are configured to affect the way a voice call is handled. As such, a result code can cause a network node to perform an action.

Examples of reason codes include:
An unrecognized command by the OCS application;
No response from the OCS or an intermediary node;
The connection to the OCS is down;
The OCS is unavailable;
Overload conditions that reach resource limit;
Overutilization, rating engine failure/unavailable; and
An unreachable tariff.

In 210, the anchoring node sends a CDR file including the CDR data to the BG. In some embodiments, the CDR file after the node has written a threshold amount of data to the CDR file. In some embodiments, the node periodically sends CDR files to the BG regardless of the amount of CDR data that the node has written to any CDR file.

In 212, the BG processes/filters CDR data to determine how much to charge the subscriber. Specifically, the BG separates CDR data associated with voice calls to be handled according to exception procedures from CDR data associated with voice calls to be handled according to default (normal) procedures. The filtering is carried out by checking whether a DCH flag associated with a voice call is set to true and whether the voice call is associated with a reason code.

In 214, the BG filters out CDR data of voice calls associated with DCH flags that are set to true but are not associated with any reason codes, and processes that CDR data according to default procedures. In contrast, in 216, the BG filters out CDR data of voice calls associated with DCH flags that are set to true but are also associated with reason codes, in which case the BG processes that CDR data according to exception procedures. That is, the BG carries out procedures to perform offline charging of those voice calls. An offline charging procedure for a specific failed-open call may depend on a specific reason code. That is, the BG can determine an exception procedure based on the reason code associated with a voice call and format a message for a rating engine by changing fields in a message to select a specific offline charging procedure.

In 218, the BG sends CDR data designated for offline charging to a default rating engine. In some embodiments, where the default rating engine is unavailable, the BG sends an offline charging request to a georedundant rating engine. For example, the BG sends modified CDR data to an SDP that is georedundant of a default SDP that would have performed the rating for online metering. The default SDP and georedundant SDP may be in the same or different geographic locations. The modified CDR data that contains all the information required to perform a rating is sent to the georedundant SDP directly in a required format for offline rating. In some embodiments, this flow can occur while a call is ongoing (e.g., periodically). Accordingly, using a georedundant SDP allows for rating a voice call despite the original SDP being offline, unavailable, or unreachable.

In 220, the rating engine that received the modified CDR data can charge the subscriber for the service utilization according to offline rating logic. The offline rating logic may charge a subscriber's account balance for a voice call as a function of the reason code indicated in the modified CDR data. For example, the offline rating logic may charge a subscriber for a failed-opened voice call a first way when the exception was due to an online metering function being available but may charge the subscriber for the failed-opened voice call a second way when the exception is due to an overutilization (e.g. if the subscriber frequently overuses her prepaid account).

In 222, if the modified CDR data includes a result code, an action of the result code is performed. For example, a result code could cause an anchoring node to retry interrogating the OCS or cause the anchoring node to continue or terminate the voice call. In some embodiments, the anchoring node writes a result code to the modified CDR and then forwards the CDR to the mediation server (e.g., billing gateway), which can perform an associated action.

Figure 3:
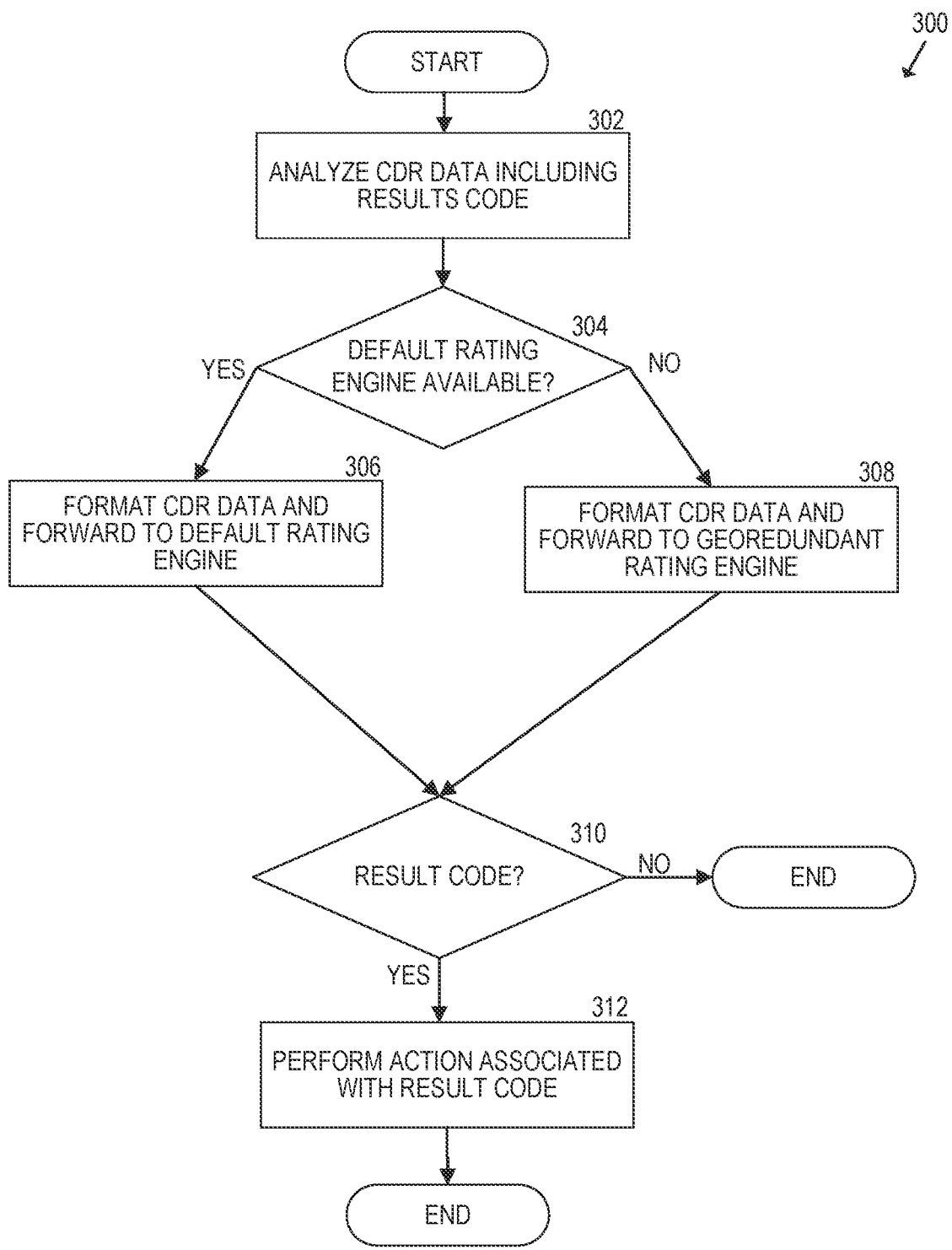
FIG. 3 is a flow diagram that illustrates an example of a process performed by a mediation server for offline charging.

FIG. 3 is a flow diagram that illustrates an example of a process performed by a mediation server for offline charging. In 302, the mediation server receives modified CDR data from an anchoring node. The mediation server analyzes the modified CDR data. The mediation server is configured to perform a variety of processes and/or actions that can depend on the reason codes and/or the result codes indicated by the modified CDR data.

In 304, a determination is made about whether a default rating engine is available. The default rating engine is the rating engine that would have performed rating for online metering of a voice call. In 306, the default rating engine is available. As such, the mediation server formats the modified CDR data accordingly and forwards the formatted CDR data to the default rating engine. The rating engine can then rate a subscriber's usage based on the formatted CDR data.

In 308, the default rating engine is unavailable. As such, the mediation server formats the modified CDR data accordingly and sends the formatted CDR data to a georedundant rating engine. That is, the mediation server sends the formatted CDR to another rating engine that is available.

In 310, the mediation server determines whether the modified CDR data includes a result code that includes or requires an action for the mediation server to perform. In 312, the modified CDR includes a result code that results in an action to be performed by the mediation server.

Figure 4:
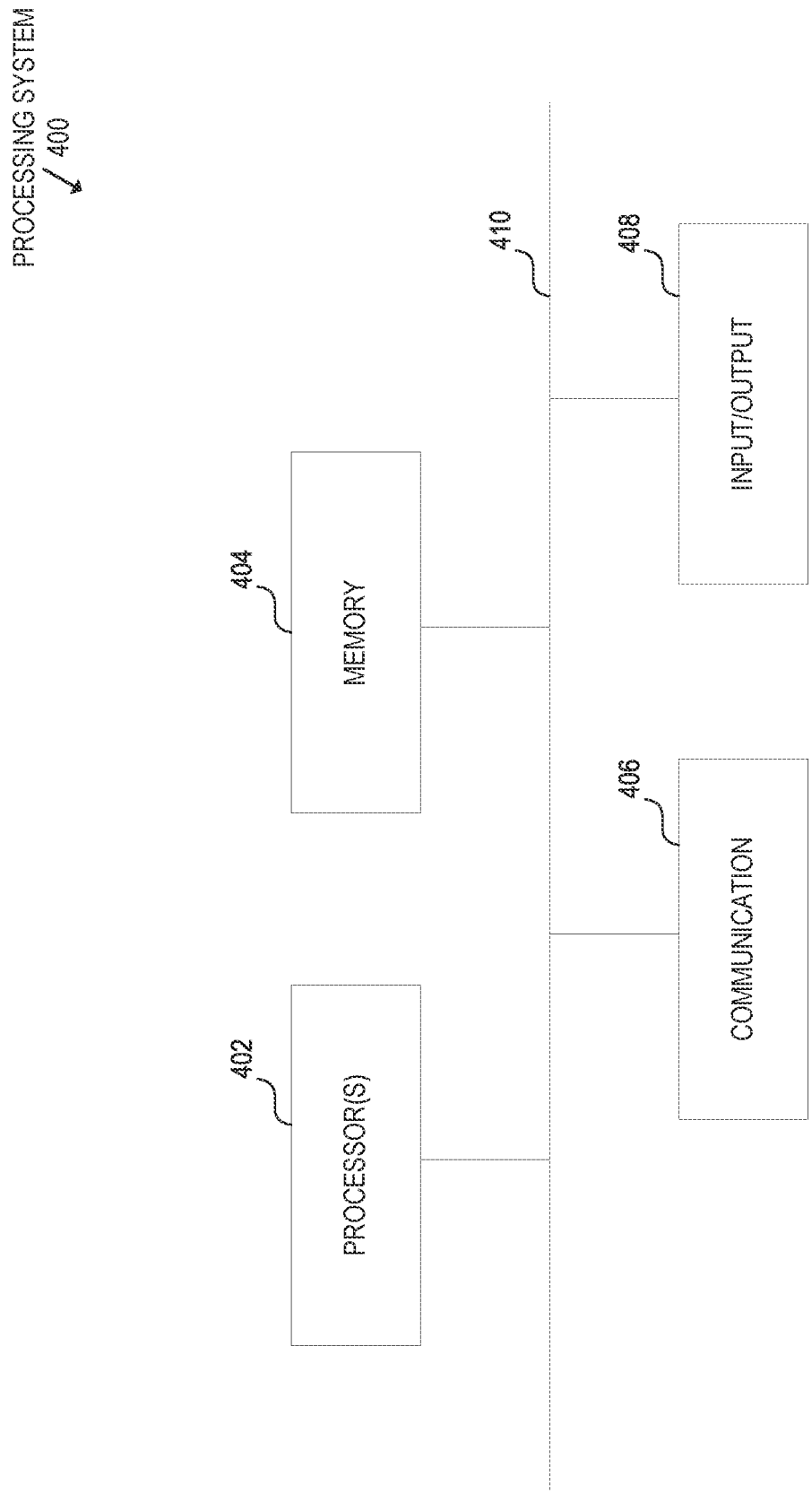
FIG. 4 is a block diagram that illustrates an example processing system in which aspects of the disclosed technology can be embodied.

FIG. 4 is a block diagram illustrating an example of a processing system 400 in which at least some operations described herein can be implemented. The processing system 400 represents a system that can run any of the methods/algorithms described above. For example, any component of the offline charging system 100 (e.g., anchoring node 102, CCN 106-1, SDP 108-1) may include or be part of a processing system 400. The processing system 400 may include one or more processing devices, which may be coupled to each other via a network or multiple networks. A network can be referred to as a communication network or telecommunications network.

In the illustrated embodiment, the processing system 400 includes one or more processors 402, memory 404, a communication device 406, and one or more input/output (I/O) devices 408, all coupled to each other through an interconnect 410. The interconnect 410 may be or include one or more conductive traces, buses, point-to-point connections, controllers, adapters and/or other conventional connection devices. Each of the processor(s) 402 may be or include, for example, one or more general-purpose programmable microprocessors or microprocessor cores, microcontrollers, application specific integrated circuits (ASICs), programmable gate arrays, or the like, or a combination of such devices.

The processor(s) 402 control the overall operation of the processing system 400. Memory 404 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 404 may store data and instructions that configure the processor(s) 402 to execute operations in accordance with the techniques described above. The communication device 406 may be or include, for example, an Ethernet adapter, cable modem, Wi-Fi adapter, cellular transceiver, Bluetooth transceiver, or the like, or a combination thereof. Depending on the specific nature and purpose of the processing system 400, the I/O devices 408 can include devices such as a display (which may be a touch screen display), audio speaker, keyboard, mouse or other pointing device, microphone, camera, etc.

While processes or blocks are presented in a given order, alternative embodiments may perform routines having steps or employ systems having blocks, in a different order, and some processes or blocks may be deleted, moved, added, subdivided, combined and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Although this disclosure generally described embodiments in the context of telecommunications services, the disclosed techniques can apply in a variety of other contexts that can benefit from offline charging by maintaining usability of rated services while mitigating revenue losses that result from an inability to perform online metering.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. A non-transitory computer-readable storage medium that stores instructions to be executed by at least one processor, wherein the instructions cause a Mobile Switching Centre Server (MSS), Telephony Application Server (TAS) or other server coupled to a telecommunications network to perform a method for offline charging, the method comprising:
   identifying an exception to online metering of a call,
      wherein the call is associated with a subscriber to the telecommunications network, and
      wherein the exception is associated with a type from among multiple types of exceptions;
   performing a default call handling (DCH) procedure to allow the call on the telecommunications network;
   changing a charging detail record (CDR) to indicate the exception and the type; and,
   enabling an offline charging procedure based on the changed CDR to charge the subscriber for at least a portion of the call.

2. The non-transitory computer-readable storage medium of claim 1, wherein identifying the exception comprises:
   receiving an indication of the exception from an online charging system (OCS).

3. The non-transitory computer-readable storage medium of claim 1, wherein identifying the exception comprises:
   satisfying a timeout condition when a response for the online metering of the call is not received within a threshold period.

4. The non-transitory computer-readable storage medium of claim 1, wherein the exception is indicated by a reason code of multiple reason codes, and wherein the reason code indicates a source of the exception to the online metering of the call.

5. The non-transitory computer-readable storage medium of claim 1, wherein the DCH procedure is performed to allow an ongoing call to continue on the telecommunications network.

6. At least one tangible computer-readable medium, excluding transitory signals, and carrying instructions, which when executed by a data processor, performs operations for offline charging based on data from a network node of a wireless telecommunications network, the operations comprising:
   obtaining an indication of an exception to online metering,
      wherein the exception indicates an inability to perform online metering of a call, and
      wherein the except is associated with one of multiple types of exceptions;
   performing a default call handling (DCH) procedure to permit the call on the telecommunications network to proceed despite the inability to perform the online metering of the call;
   generating a modified charging detail record (CDR) that includes an indication of the type of the exception; and
   sending at least an indication of the modified CDR to enable offline charging of a subscriber for the call.

7. The computer-readable medium of claim 6 further comprising, prior to enabling the offline charging:
   identifying a reason code from multiple reason codes, wherein the reason code indicates a source of the exception;
   mapping the reason code to a result code associated with an action; and
   performing the action indicated by the result code.

8. The computer-readable medium of claim 6, wherein the call is an ongoing call and includes a request to continue the ongoing call on the telecommunications network.

9. The computer-readable medium of claim 6, wherein the modified CDR reflects data about only a portion of the call.

10. The computer-readable medium of claim 6 further comprising, prior to enabling the offline charging:
    identifying a reason code from multiple reason codes, wherein the reason code indicates a source of the exception;
    mapping the reason code to a result code associated with an action; and
    performing the action indicated by the result code, and wherein the action is for the network node to re-interrogate an online charging system (OCS) to perform the online metering of the call.

11. The computer-readable medium of claim 6 further comprising, prior to enabling the offline charging:
    identifying a reason code from multiple reason codes, wherein the reason code indicates a source of the exception;
    mapping the reason code to a result code associated with an action; and
    performing the action indicated by the result code, wherein the action is for the network node to continue the call.

12. The computer-readable medium of claim 6 further comprising, prior to enabling the offline charging:
    identifying a reason code from multiple reason codes, wherein the reason code indicates a source of the exception;
    mapping the reason code to a result code associated with an action; and
    performing the action indicated by the result code, wherein the action is for the network node to terminate the call.

13. The computer-readable medium of claim 6, wherein each reason code of multiple reason codes indicates a source of an exception to the online metering, wherein the multiple reason codes comprise:
    an indication that an application of an online charging system (OCS) received an unrecognized command;
    an indication that the OCS or another related node failed to respond;
    an indication that a connection to the OCS is broken;
    an indication that the OCS is unavailable;
    an indication of an overload condition caused by a resource reaching a limit;
    an indication of an overutilization, failure, or unavailable rating engine; and
    an indication of an unreachable tariff.

14. The computer-readable medium of claim 6, wherein generating the modified CDR comprises:
    setting a DCH flag to true; and adding a reason code for the exception, wherein the reason code indicates a source of the exception.

15. The computer-readable medium of claim 6, wherein the request is sent to a charging control node (CCN) of an online charging system, and obtaining an indication of the exception comprises:
receiving a response from the CCN, wherein the response indicates the exception.

16. A server system comprising:
at least one hardware processor; and
at least one non-transitory memory, coupled to the at least one hardware processor and storing instructions, which, when executed by the at least one hardware processor, cause a Mobile Switching Centre Server (MSS), Telephony Application Server (TAS), or other server system to:
identify an exception to online metering of a call,
wherein the call is associated with a subscriber to the telecommunications network, and
wherein the exception is associated with a type from among multiple types of exceptions;
perform a default call handling (DCH) procedure to allow the call on the telecommunications network;
change a charging detail record (CDR) to indicate the exception and the type; and,
enable an offline charging procedure based on the changed CDR to charge the subscriber for at least a portion of the call.

17. The system of claim 16, wherein to identify the exception comprises causing the system to:
receive an indication of the exception from an online charging system (OCS).

18. The system of claim 16, wherein to identify the exception comprises causing the system to:
satisfy a timeout condition when a response for the online metering of the call is not received within a threshold period.

19. The system of claim 16, wherein the exception is indicated by a reason code of multiple reason codes, and wherein the reason code indicates a source of the exception to the online metering of the call.

20. The system of claim 16, wherein the DCH procedure is performed to allow an ongoing call to continue on the telecommunications network.

\* \* \* \* \*